Oct. 19, 1943.

I. N. VAUGHN 2,332,122

BRAKE AND MOTOR CONTROL DEVICE

Filed Feb. 10, 1941

INVENTOR.
Isaac N. Vaughn,

BY Myron F. Chase

ATTORNEY.

Patented Oct. 19, 1943

2,332,122

UNITED STATES PATENT OFFICE 2,332,122

BRAKE AND MOTOR CONTROL DEVICE

Isaac Newton Vaughn, Bell, Calif.

Application February 10, 1941, Serial No. 378,230

4 Claims. (Cl. 192—3)

The present invention relates generally to a foot control for the hydraulic brake operating means or connections of automobiles and other motor vehicles, and more particularly a device by which the motor of the vehicle is also controlled in a manner which causes the motor to be cut down to idling speed whenever the brakes are applied.

Devices of the above nature have been proposed in forms more or less applicable to incorporation in a motor vehicle as a part of its original equipment, but it is one of the primary objects of the present invention to provide a device which may be quickly and easily installed, at minimum expense, and effectively mounted, as an attachment to motor vehicles already in use with separate, independent, brake and accelerator pedals.

A further object of the present invention is the provision of a device of the above nature, including a brake control arrangement which permits of, and provides for, an extremely simple, positive and unfailing throttle control means, whereby the usual independent foot throttle may be entirely removed.

Among the further objects of the invention may be said to be the provision of a brake control arrangement permitting, and providing for, compounding of the power of brake application, reduction of the range and pressure of foot control movement in the operation of the brake pedal, and variation in the swing of the brake pedal so that it moves bodily as well as pivotally, giving it a falling movement which follows the normal, natural line of foot travel of the vehicle operator.

A still further object may be said to be the close coupling of the relatively movable control parts affecting brake application and throttle control, in a manner which admits of ready adjustment and replacement of such parts, and provides for their continuous, effective operation in the presence of dirt, water and other conditions that are commonly faced in the operation of motor vehicles.

The foregoing, along with other and further objects of the invention, may be better understood and more thoroughly appreciated by a careful consideration of the following description thereof in detail, and by reference to the accompanying drawing, illustrating the invention in its practical application, and forming a part of this specification. In this drawing.

Figure 1:
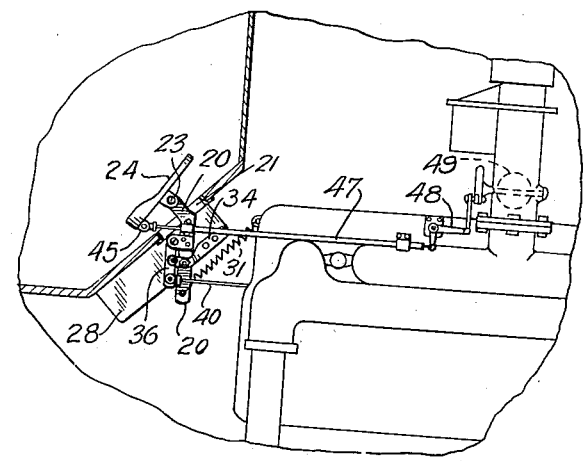
Figure 1 is a sectional side view showing the practical application of the invention in connection with a motor vehicle.
Figure 4:
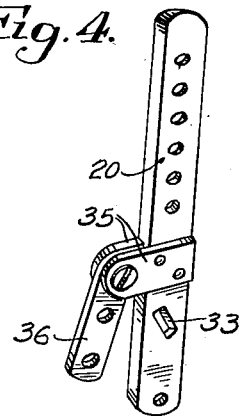
Figure 4 is a detail perspective view of certain parts thereof, removed.

Referring now to the several figures of the drawing, and more particularly to Figure 1, the present invention in its adaptation as a readily and quickly applicable attachment or accessory to a motor vehicle, contemplates the employment of a normally upright brake actuating foot lever 20, preferably having an angular upper end portion adapted to upstand through a slotted opening 21 in the floor board 22 of a motor vehicle. This opening 21 may be an extension, or enlargement, of the usual slotted opening accommodating the upwardly and rearwardly extending portions of the ordniary brake lever. Preferably the floor treadle or plate 24 is intermediately pivoted at 23 upon the upper end of the upper angular portion of lever 20, so that it may move or swing therewith and as a part thereof, during brake application, and pivot thereon for movement independently thereof during normal throttle control.

Preferably, also, the above parts are arranged so the upper end of lever 20, and its pivoted foot plate 24, stand in a position relative to the operator of the vehicle, somewhat below the position ordinarily occupied by the usual brake lever, so that its dual use will be more convenient and comfortable.

The invention also contemplates that, for the support of the brake actuating foot lever 20, a short supporting bracket 28 may be rigidly secured, for example to the lower surface of the floor board 22, by any means suitable to the anchoring of the said bracket along one lower side of the floor board opening 21, as plainly seen in Figure 1.

Figure 2:
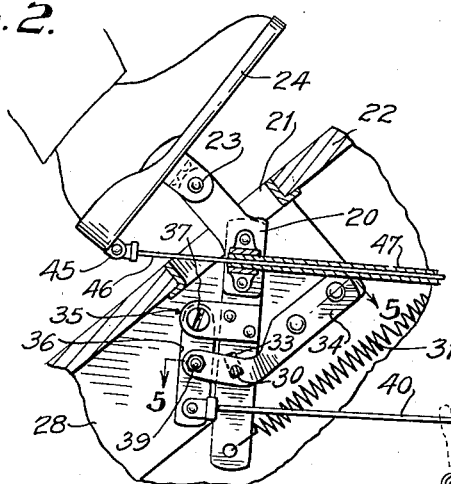
Figure 2 is an enlarged view, particularly showing the brake control means with a form of brake control connections, the several parts being in the neutral or inactive position.
Figure 3:
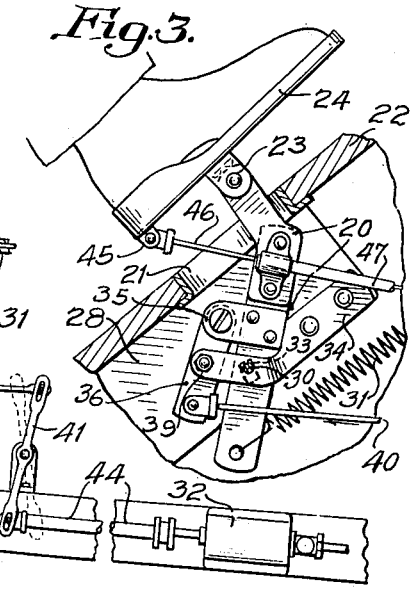
Figure 3 is a similar view of the brake control means, with the parts in the position effecting brake application.

The lever 20 of the present invention has a fulcrum 30 intermediate its ends on the bracket 28, and its lower end may depend below said bracket to provide for the attachment of one end of a controlling spring 31, the other end of which may be suitably anchored on a portion of the motor vehicle so that its tension constantly urges the lever 20 in a direction to swing its upper end portion rearwardly to a normal upright, neutral position, as shown in Figures 1 and 2.

The control parts as thus generally mounted or anchored in connection with the vehicle by, and upon, the bracket 28, are disposed in many instances rearwardly of the master cylinder of the hydraulic brake system of the vehicle. This cylinder is not shown in Figure 1, but does appear in Figure 2, where it is indicated at 32, for further reference hereinafter.

The lever 20 has intermediate its ends a slotted opening 33 inclined with respect to its longitudinal axis in a forwardly and downwardly direction. Through this slot the fulcrum bolt 30 is extended and securely fixed at its ends to the bracket 28 and a bracket arm 34, so that the lever 20 is free to pivot on the bolt 30 and slide in an up and down, laterally shifting movement, between said bracket and bracket arm. Above its slot 33 the lever 20 has laterally projecting arms 35 rigidly secured thereto, and outstanding therefrom, and to the free ends of which arms, the upper end of a relatively short compounding lever 36 is pivotally connected, as by means of a pivot bolt 37.

Figure 5:
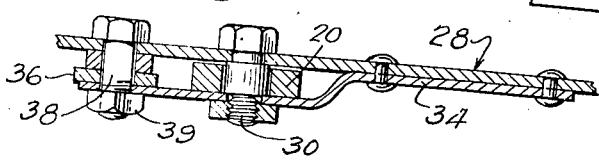
Figure 5 is a sectional view through certain of the parts of Figure 2, taken substantially on line 5—5 of said figure, and, Figure 6 is a detail perspective view of the bracket arm of Figures 2 and 3.
Figure 6:
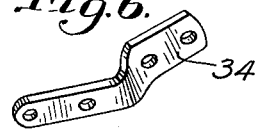

The lever 36 is fulcrumed intermediate its ends upon a bolt 38 which is fixed through the bracket 28 and bracket arm 34 at a point laterally, rearwardly of the pivot bolt 30. The bolt 38 may be locked by a nut 39 as seen in Figure 5. At its lower end, lever 36 is in pivotal connection with the rear end of a connecting rod 40 or other suitable connecting member through which movement of the said lever may be communicated to the master cylinder plunger.

In the present exemplification of the invention, the connecting rod 40 is shown with its forward end pivotally connected to the upper end of an intermediately pivoted lever 41, whose lower end is similarly connected with the plunger rod 44 of the master cylinder 32 as in Figure 2. In this way the connecting rods 40 and 44 will usually extend in approximately horizontal positions forwardly beyond the lever 36 and the lower portion of the brake lever 20.

The foot plate 24 of the brake lever 20 is freely tiltable on its pivot 23 at the upper end of the brake lever when the latter is in normal, upright and neutral or inactive position as in Figures 1 and 2. To the heel end of this foot plate, at 45, is pivotally connected the adjacent end of a control wire 46 which is slidable through a flexible sheath 47. The sheath is extended forwardly to a point adjacent to the throttle of the motor, and here the forward end of the control wire is connected to a spring controlled throttle actuating lever 48 for actuating the throttle valve indicated at 49 in Figure 1. These connections may displace the usual and well known wire and sheath control connection commonly leading from the accelerator pedal to the throttle, but in the present instance the sheath 47 is attached at its rear end to the lever 20, as plainly seen in Figure 2, and is otherwise free to move bodily with the brake applying and releasing movements of this lever. As seen in Figure 1, the control wire 46 and its sheath 47 are extended in a substantially straight line between the throttle lever 48 and the foot plate 24, in the brake released or normal position of the brake lever 20, so that by tilting the toe portion of the plate forwardly, the wire 46 is pulled rearwardly to open the throttle. This can only take place as long as brake lever 20, in its normal position, maintains the throttle control unit, consisting of tiltable foot plate 24, wire 46 and sheath 47, at a definite distance rearwardly of the throttle lever 48. When the brake lever is shifted forwardly to brake applying position, the throttle control unit is bodily shifted toward the throttle, and the flexible wire 46 and sheath 47 are moved to a position where the wire can only influence the throttle to closed position, and is ineffective to open the throttle by tilting movements of the foot plate. For the foregoing purpose, it is contemplated that the sheath 47, which is connected at its rear end to the brake applying lever 20, shall have no other connection with any part of the apparatus such as to prevent its lengthwise movement forwardly and rearwardly when the brake applying lever is moved to effective brake-applying position, and released for return movement, although said sheath may be guided in its movement through any suitable bracket on the vehicle motor at a point spaced from the carburetter.

In the foregoing manner, during any brake applying movements of the brake lever 20, the throttle control connections are shifted to a position which unfailingly frees the throttle valve from any control by the foot plate 24 until the lever 20 returns to normal position.

As to the brake control parts, it is apparent that as the brake lever 20 swings forwardly it also lowers bodily by reason of its slot 33, so that the pivot 37 connecting the two levers 20 and 36 gradually approaches closer and closer to the fulcrum 30 of lever 20, and the power through lever 36, against the plunger of the master cylinder, gradually increases, until the fulcrum bolt 30 is at the upper end of the slot 33. In this operation the brake lever 20 has a falling forward movement rather than a true swing, which enables the operator to use a powerful leg pressure in a normal, natural line from the operator's seat.

Since the flexible control wire 46 and its flexible sheath 47 are bodily shifted toward the throttle valve during brake application, it is plain that the throttle control cannot be restored, after brake application has once started, until the brake control parts are released and return to the normal position of Figures 1 and 2. Any danger of opening of the throttle valve during brake application is, in this way, avoided without resorting to locking means or otherwise interfering with freedom of the foot plate 24 to rock during brake application as well as during throttle control. Its rocking movements are simply rendered ineffective for throttle control during brake application.

Thus, among other things, the invention provides a dual control which may be fully assembled and applied as a unit to a motor car, to thus render the installation quicker, easier and less expensive than other devices of its general character heretofore proposed. One way in which installation of the unit has been disclosed, but it will be understood that the invention is not to be limited to the particular connections shown and described as leading to the throttle valve 49 and the master cylinder plunger 44 as these may, of necessity be varied in accordance with the various makes of motor cars.

Having thus fully described the invention, what is claimed is:

1. In a device for actuating the brake operating means of a motor vehicle, an upstanding foot lever, pivot means intermediate the ends of said lever and with respect to which the lever is swingable and at the same time shiftable in the direction of its length, a second relatively short lever alongside the lower portion of the foot lever, means forming a pivotal connection between the upper portion of the second lever and the foot lever above the pivot means of the latter, which pivotal connection is shiftable toward and away from the pivot means of the foot lever when the latter swings during brake application, by reason of the lengthwise shifting movements of the foot lever, means forming a fixed pivot for said second lever intermediate its ends, and means operatively connecting the second lever below its pivot with the brake operating means.

2. In a device for actuating the brake operating means of a motor vehicle, an upstanding foot lever, pivot means intermediate the ends of said lever and with respect to which the lever is swingable and shiftable in the direction of its length, a second relatively short lever along a portion of said foot lever and pivotally connected at its upper end to said foot lever above the pivot of the latter, means forming a fixed pivot for said second lever intermediate its ends, and means connecting the lower end of said second lever with the brake operating means.

3. In a device for actuating the brake operating means of a motor vehicle, an upstanding foot lever having a slotted opening therein arranged at an angle to its longitudinal axis, a pivot member extending through said slot and on which the lever is shiftable in the direction of its length during swinging movements thereof, a relatively short intermediately pivoted lever alongside a portion of said foot lever, means forming a pivotal connection between one end of said second lever and the foot lever at a point spaced lengthwise from the slot of the latter, and means operatively connecting the other end portion of said second lever with the brake operating means.

4. In a device for actuating the brake operating means of a motor vehicle, an upstanding foot lever having a slotted opening therein arranged at an angle to its longitudinal axis, a pivot member extending through said slot and on which the lever is shiftable in the direction of its length during swinging movements thereof, a relatively short intermediately pivoted lever substantially paralleling a portion of said foot lever and spaced laterally therefrom, means forming a pivotal connection between the upper end portion of said second lever and the foot lever at a point spaced lengthwise of the latter above its pivot, and means operatively connecting the lower end portion of said second lever with the brake operating means.

ISAAC NEWTON VAUGHN.